May 10, 1966     J. G. ADILETTA     3,250,398
BEVERAGE FILTERS
Original Filed Feb. 29, 1960
FIG. 1
FIG. 2
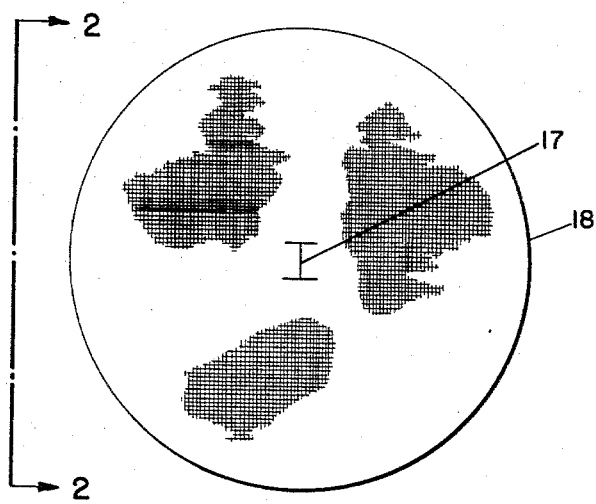
FIG. 3
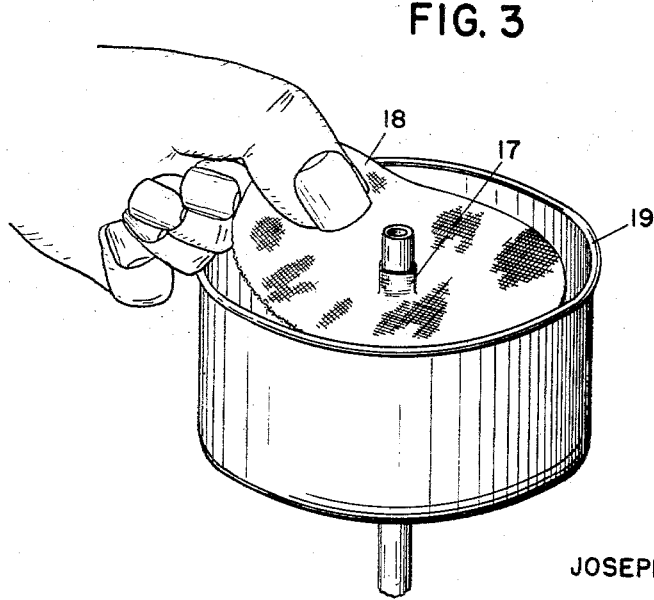
INVENTOR.
JOSEPH GEORGE ADILETTA
BY
William A. Drucka
ATTORNEY 3,250,398
BEVERAGE FILTERS
Joseph G. Adiletta, Riverside, Conn., assignor, by mesne assignments, to Pall Corporation, Glen Cove, N.Y., a corporation of New York
Original application Feb. 29, 1960, Ser. No. 11,730. Divided and this application Jan. 27, 1964, Ser. No. 347,328
7 Claims. (Cl. 210—507)

This is a division of application Serial No. 11,730, filed February 29, 1960, now abandoned.

This invention relates to articles of manufacture in the form of filters for hot beverages such as tea and coffee.

Paper and cloth beverage filters, made from vegetable fibers, are known. Such filters are ordinarily suitable for only about one use and are generally relatively coarse in pore size. In order to prevent paper fiber filters from degradation by boiling water a plastic coating has sometimes been used as a binder. Many materials used for fibers or polymer coatings are unstable at this temperature in that they either deform, or separate or they may release traces of disagreeable material on hot leaching. However, pore size small enough to remove most coffee sediment and mud, generally results in very slow flow rates in paper filter. Glass paper and glass cloth filters alone do not offer good control of pore size. Paper without binder disintegrates and known binders leach out to give off taste. Cloth without a binder does not hold a small enough uniform pore size.

Accordingly, it is an object of this invention to provide an article of manufacture in the form of a filter sheet useful as a filter for hot beverages such as tea, coffee and chocolate.

It is also an object of this invention to provide a filter which is stable and inert as to flavor and toxicity at 100 degrees C.

It is also an object of this invention to provide a filter element having a central opening which fits tightly about the apparatus in which it is used.

It is a further object of this invention to provide a filter element of fine uniform pore size having a high throughflow capacity.

These and other objects of the invention are realized by forming a filter element from a porous sheet of fluorinated olefin plastic such as poly(tetrafluoroethylene). Poly(chlorotrifluoroethylene) may also be used. Preferably the filter element is in the form of a mineral fiber reinforcing substrate fabric sheet coated with the plastic. Glass fiber is preferred. Although glass paper may be used, woven glass cloth is preferred as a substrate for greater strength.

In the drawing a preferred form of filter element is shown as a disc of glass cloth coated with plastic and provided with a central opening to accommodate the stem of some domestic coffee brewing devices.

Corresponding characters in the figures of the drawing relate to like elements and:

FIG. 1 is a plan view of a preferred filter element made according to the invention;

FIG. 2 is a side elevation taken on line 2—2 of FIG. 1 showing fabric;

FIG. 3 is a perspective view of the element of FIG. 1 being inserted in the basket of a coffee brewing device.

The hole may be omitted or a slit 17 may be used and particularly a cruciform or H shape slit to provide a closure flap.

An advantage results from use of a slit or multiple slits (as in a star pattern) rather than a punched hole in that there is no waste disposal problem for trimmings left in manufacture.

In a preferred form of the invention a glass cloth of two mil diameter fibers, having pores which pass particles up to about 300 microns in diameter is coated with a slurry of poly(tetrafluoroethylene) and the plastic is fused to the cloth in an oven so that the finished material contains 20–40% by weight resin and preferably about ⅓ resin.

The coated fabric has apertures or pore openings of about 30 to 100 microns. About a three or four inch diameter disc 18 may be die cut from the fabric and used in a beverage maker 19. This may also be cut to other diameters or other shapes such as ovals. The element may also be folded for use in funnel type filters.

This filter makes better coffee than known filters. Almost all sediment is removed. Coffee of equal strength can be made in a given device using less powdered coffee than in the same device not equipped with the present filter.

Sediment in coffee beverages is important in making a bitter or rancid flavor. By making coffee with the filter of this invention a relatively sediment free fluid is produced. Accordingly, this beverage can be kept hot longer or reheated more often than ordinary coffee without loss of flavor.

These filter elements are stable and can be reused many times without change in filteration properties. They are easily rinsed clean. The non-stick surface qualities of the plastic, poly(tetrafluoroethylene), contribute to sanitary qualities.

Filters of this invention are suitable for hot beverages including coffee, tea and chocolate. They do not affect the flavor of beverages and are reusable.

Use of heat stable plastics, either reinforced by inert fibers or in the form of plastic alone, results in particular advantages in contact with hot food products. Temperature stability and freedom from off flavor and toxic effects make a unique combination of properties as an article of manufacture.

What is claimed is:
1. A hot beverage filter resistant to deterioration at the temperature of boiling water consisting essentially of a woven glass fabric substrate having open pores therethrough of a pore size larger than 30 microns, having thereon a layer of a fluorinated olefin plastic selected from the group consisting of poly(tetrafluoroethylene) and poly(chlorotrifluoroethylene) in an amount within the range from 20 to 40% by weight plastic, thereby reducing the pore size of the glass fabric substrate to between 30 and about 100 microns.

2. An article according to claim 1 in which the resin is poly(tetrafluoroethylene).

3. An article according to claim 1 in which the resin is poly(chlorotrifluoroethylene).

4. An article according to claim 1 in which the sheet is in the form of a disc.

5. An article according to claim 1 in which the sheet is provided with a central opening.

6. An article according to claim 5 in which the opening is an H-shaped slit.

7. A beverage filter according to claim 1 containing about ⅓ by weight of the fluorinated olefin plastic.

References Cited by the Examiner

UNITED STATES PATENTS

| | | | |
|---|---|---|---|
| 2,546,874 | 3/1951 | Siegrist | 210—457 XR |
| 2,551,175 | 5/1951 | Smith | 210—508 XR |
| 2,648,617 | 8/1953 | Hanson | 210—507 XR |
| 2,658,848 | 11/1953 | Labino | 210—500 XR |

OTHER REFERENCES

Smucker et al.: "Application of Glass Fibers in Filtration Processes," Industrial and Engineering Chemistry, vol. 46, No. 1, pp. 176–178 (January 1954).

The Condensed Chemical Dictionary, 1956, by Rose et al., 5th ed. Reinhold Pub. Co. (N.Y.), p. 1067.

"Strong Filter Media," Chemical Engineering, vol. 67, No. 11, p. 74, May 30, 1960.

ALBERT T. MEYERS, *Primary Examiner.*

JULIUS GREENWALD, *Examiner.*

M. WEINBLATT, *Assistant Examiner.*